United States Patent [19]

Nakao et al.

[11] Patent Number: 5,157,385
[45] Date of Patent: Oct. 20, 1992

[54] JAGGED-EDGE KILLER CIRCUIT FOR THREE-DIMENSIONAL DISPLAY

[75] Inventors: Hayato Nakao, Yokosuka; Takeshi Shibamoto, Sagamihara; Masahiro Araoka, Sapporo, all of Japan

[73] Assignee: Victor Company of Japan, Ltd., Yokohama, Japan

[21] Appl. No.: 601,869

[22] Filed: Oct. 23, 1990

[30] Foreign Application Priority Data

Oct. 25, 1989 [JP] Japan .................................. 1-277739

[51] Int. Cl.$^5$ .............................................. G09G 1/06
[52] U.S. Cl. .................................... 340/729; 340/723
[58] Field of Search ................ 364/522, 523; 340/723, 340/729

[56] References Cited

U.S. PATENT DOCUMENTS

| | | | |
|---|---|---|---|
| 4,811,245 | 3/1989 | Bunker et al. | 340/729 |
| 4,825,391 | 4/1989 | Merz | 364/522 |
| 4,918,626 | 4/1990 | Watkins et al. | 364/522 |
| 4,945,500 | 7/1990 | Deering | 340/723 |

Primary Examiner—Ulysses Weldon
Attorney, Agent, or Firm—Michael N. Meller

[57] ABSTRACT

A jagged-edge killer circuit for a three-dimensional display, comprises a frame buffer for storing data of each pixel on the display screen by a pixel unit; a Z-buffer for storing distance data in a depth direction of a picture by a sub-pixel unit into which the pixel as a storage unit of the frame buffer is subdivided in a predetermined number; a picture data buffer for storing picture data by the sub-pixel unit; an element for comparing the distance data stored in the Z-buffer with new distance data in the depth direction about each new sub-pixel into which new pixel is subdivided in the predetermined number when picture data of said new pixel are written in the picture data buffer; a first element for renewing storage contents of the picture data buffer about only sub-pixel having nearer distance in the depth direction within the sub-pixels subdivided from the new pixel into the predetermined number on the basis of a comparison result of the comparing element; a second element for renewing storage contents of the Z-buffer by the new distance data of the sub-pixels having the predetermined number corresponding to the new pixel; and an element for generating picture data of the pixel unit in the frame buffer by performing an arithmetical mean of the picture data of the sub-pixel unit having the predetermined number in the picture data buffer.

7 Claims, 4 Drawing Sheets

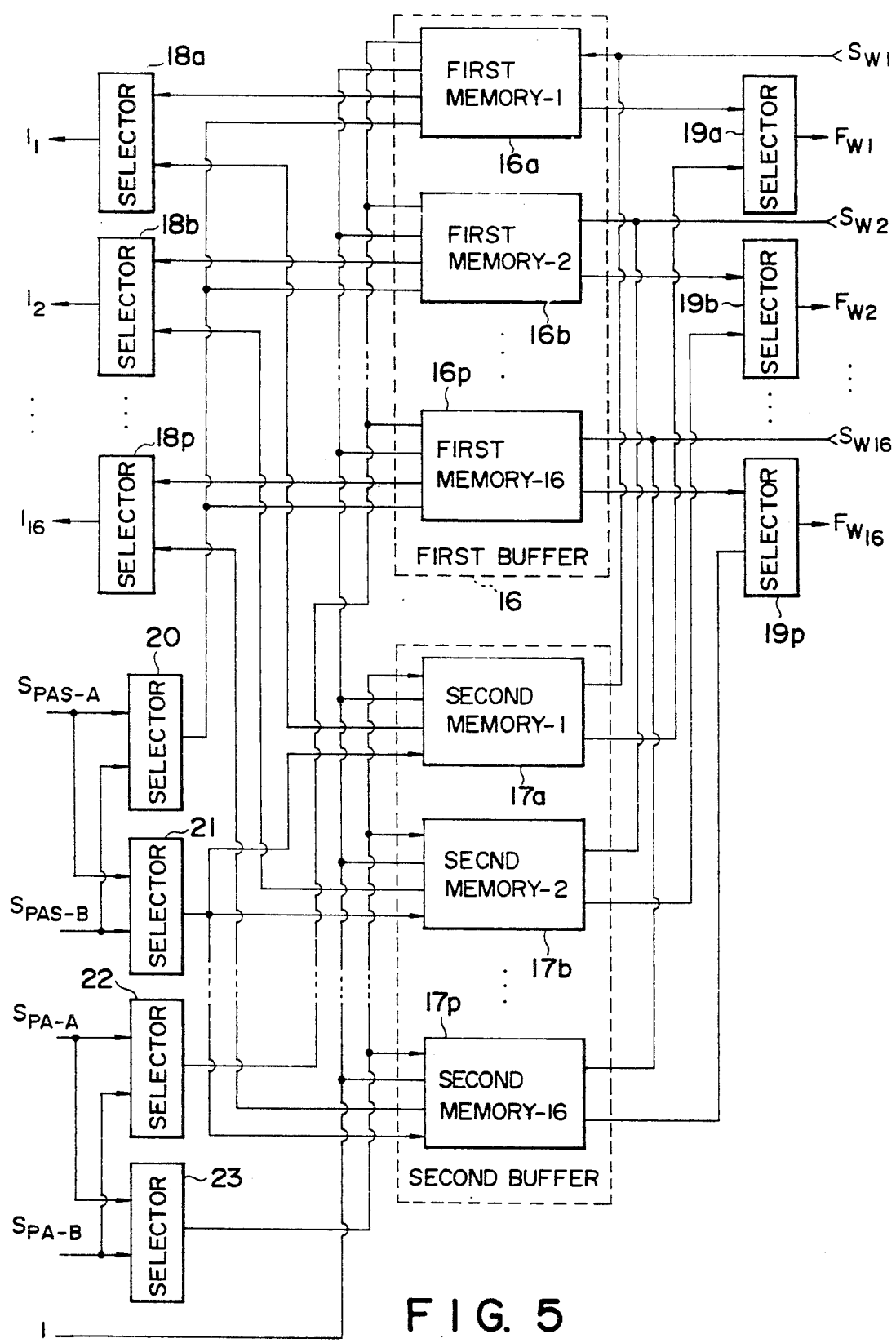
F I G. 5

JAGGED-EDGE KILLER CIRCUIT FOR THREE-DIMENSIONAL DISPLAY

BACKGROUND OF THE INVENTION

The present invention relates to a jagged-edge killer circuit used for a three-dimensional display.

Hidden surfaces are removed when displaying three-dimensional image. Here, "hidden-surface" means a picture existing in a portion behind an object which has a short distance from a viewpoint in the depth direction within the three-dimensional image. In many case, the boundary generated between a hidden surface and a displayed surface as a result form the hidden surface removal, accompanies so-called jugged-edge or jaggy-edge.

The jagged-edge is wearsome for a viewer, therefore, it is desirable to adopt the jagged-edge killer with the hidden surface removal.

There is conventionally known a Z-buffer method as one of various jagged-edge killing methods, which has the merit of being capable of eliminating the jagged-edge in spite of the shape and output order of the surface to be displayed.

FIG. 1 shows a block diagram of the schematic structure of a conventional jagged-edge killer circuit used in the application of the jagged-edge killing by the Z buffer method.

In the figure, a Z-buffer 1 stores distance data in the depth direction corresponding to each pixel of a display frame buffer 3. The distance data of the depth direction, which is stored in the Z-buffer 1, is supplied to a renewal circuit 2 as data $Z_{old}$.

The renewal circuit 2 receives data of the X and Y addresses of the pixels on the frame buffer 3, distance data $Z_{new}$ of the pixels in the depth direction, and a luminance I of the pixels, and compares the new distance data $Z_{new}$ of the pixels in the depth direction with the old distance data $Z_{old}$ of the pixels in the depth direction stored in the Z-buffer 1 when luminance or color data of the pixels is written in the frame buffer 3. Only when the new pixels have a distance shorter than the old pixels from the viewpoint in the depth direction, a writing signal $S_W$ renews the storage contents of the frame buffer 3 by the luminance I or color data corresponding to the new pixels, and the distance data $Z_{new}$ of the new pixels renews the storage contents of the Z-buffer 1.

A picture is reproduced from image data read out of the frame buffer 3 when the conventional circuit shown in FIG. 1 performs the jagged-edge killing. As the reproduced picture is quantized pixel by pixel at the killing, the luminance or color becomes discontinuous so as to generate jagged portions in a step-shape at an outline which has an ordinally continuous area.

Even though the jagged portions can be eliminated by means that the luminance or color can be displayed after adding a post-filtering, it is possible to obtain the reproduced picture only having a low resolution because of the reduction of the pixel numbers constructing one scene.

SUMMARY OF THE INVENTION

An object of the present invention is to provide a jagged-edge killer circuit capable of eliminating jagged portions from continuous outlines dividing different areas on a display screen without reducing the pixel numbers constructing one scene, namely, without deteriorating the resolution of a reproduced picture.

In order to achieve the above object, the jagged-edge killer circuit according to the present invention comprises a frame buffer for storing data of each pixel of the display screen by a pixel unit, a Z-buffer for storing distance data in the depth direction of the picture of a sub-pixel unit into which the pixel unit as a stored unit of the frame buffer is subdivided in a predetermined number, a picture data buffer for storing picture data of a luminance color by the sub-pixel unit, renewal means for renewing the contents stored in the picture data buffer by picture data of new pixels only with respect to sub-pixels nearer in the depth direction to a viewpoint within sub-pixels into which new pixels are subdivided in the predetermined numbers by comparing the distance data in the depth direction of each sub-pixel subdivided in the predetermined number of the new pixels with distance data in the depth direction of each sub-pixel stored in the Z-buffer when the picture data of the new pixel is written in the picture data buffer, and for renewing the contents stored in the Z-buffer by the distance data of a plurality of sub-pixels corresponding to the new pixels, and means for generating picture data of the pixel unit in the frame buffer by the arithmetical mean of the picture data of a plurality of sub-pixel units in the picture data buffer.

For storing the display data, the frame buffer stores luminance or color (picture) data of each pixel of the display screen by the pixel unit.

The Z-buffer stores distance data in the depth direction of the picture by the sub-pixel unit into which the pixel as the storage unit of the frame buffer is subdivided in the predetermined numbers.

As the picture data buffer is provided for storing the picture data by the sub-pixel unit, the distance data in the depth direction of each sub-pixel subdivided from the new pixel into the predetermined numbers, is compared with distance data in the depth direction of each sub-pixel stored in the Z-buffer, thereby renewing the storage contents of the picture data buffer by the picture data of the new pixels with respect to the sub-pixels nearer in the depth direction to the viewpoint within sub-pixels subdivided from the new pixels into the predetermined numbers, and at the same time renewing the storage contents of the Z-buffer by the distance data of the plurality of sub-pixels corresponding to the new pixels.

The picture data of the pixel unit in the frame buffer, is generated by the arithmetical mean for the pixel data of a plurality of the sub-pixel units in the picture data buffer.

Therefore, the reproduced picture which is displayed on the basis of the picture data read out of the frame buffer, has a high resolution and non-jagged edge.

As is apparent from the above, the jagged-edge killer circuit of the present invention is characterized in that one pixel of the displayed picture is subdivided into a predetermined number such as "M×N" of sub-pixels, new distance data in the depth direction of each sub-pixel are compared with old data, picture data such as luminance or color data of the sub-pixels and distance data in the depth direction of the sub-pixels are both rewritten corresponding to the comparison result, and the picture data of one sub-pixel is operated by the arithmetical mean, thereby using the arithmetical mean value as the picture data of one pixel. Accordingly, it is possible to obtain a high-resolution reproduced picture and to prevent the reproduced picture form the jagged edge on the basis of picture data read out of the frame buffer. Furthermore, it is easy to perform the non-jagged matching by using an α value.

BRIEF DESCRIPTION OF THE DRAWINGS

In the accompanying drawings:

FIG. 5 is a block diagram showing an example of a main portion of the picture data buffer.

DETAILED DESCRIPTION OF THE PREFERRED EMBODIMENT

There will be described in detail a concrete content of a jagged-edge killer circuit according to the present invention with reference to the accompanying drawings.

Figure 1:
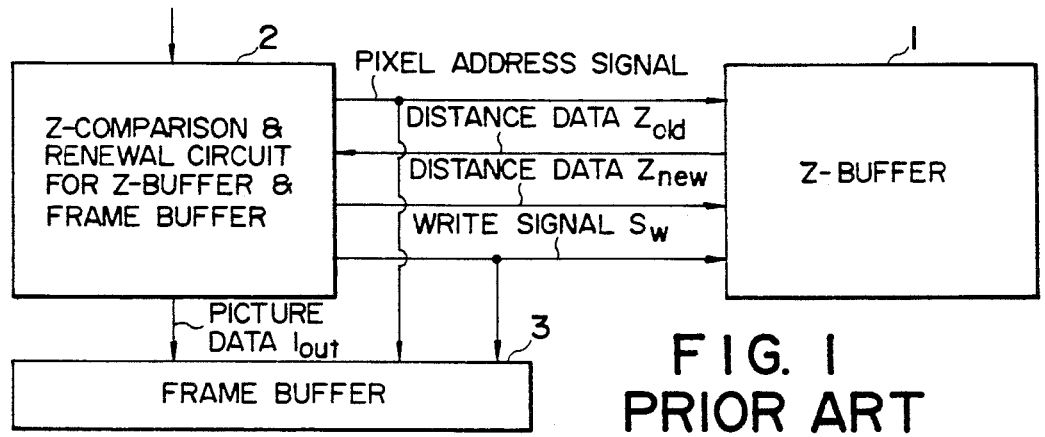
FIG. 1 is a block diagram showing a schematic structure of a conventional jagged-edge killer circuit used when a jagged-edge killing by a Z buffer method is performed.
Figure 2:
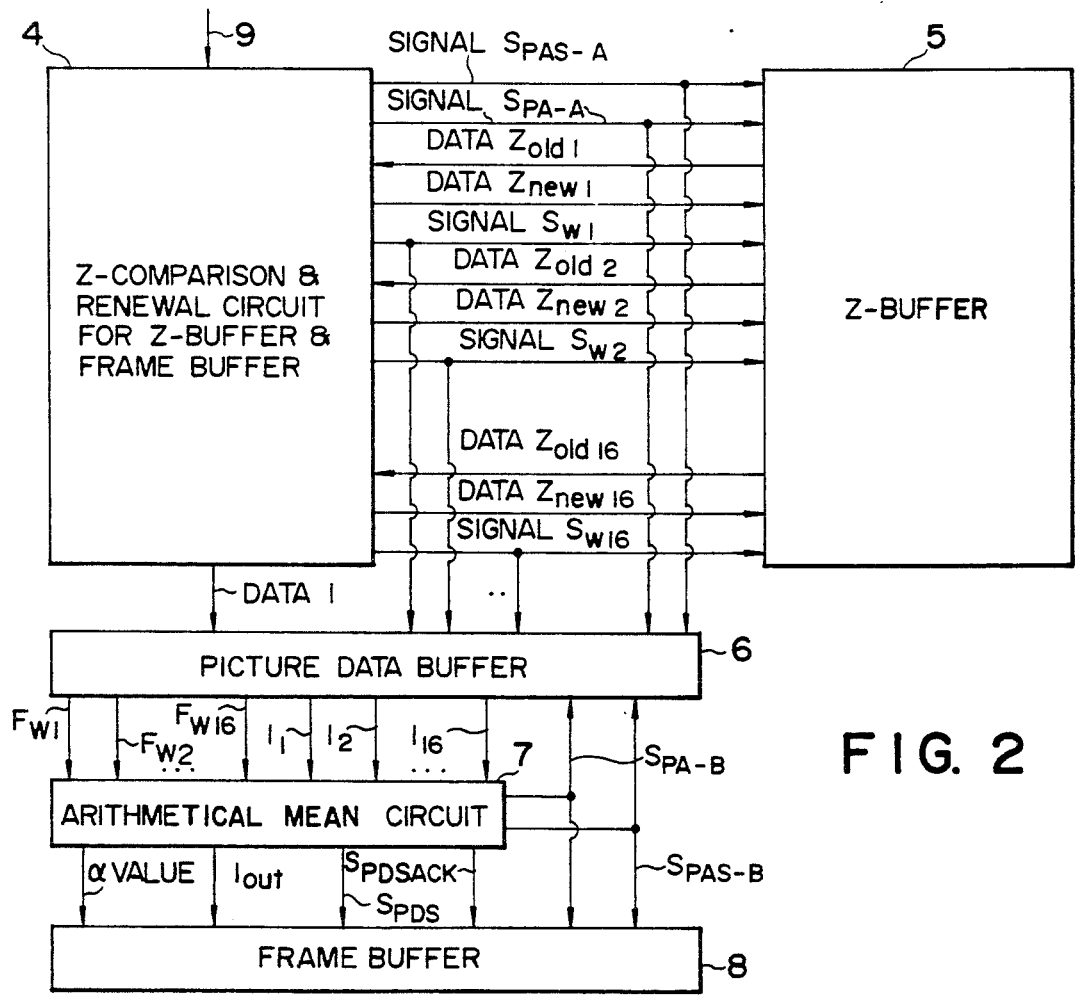
FIG. 2 is a block diagram showing a schematic structure of a jagged-edge killer circuit according to the present invention.
Figure 3:
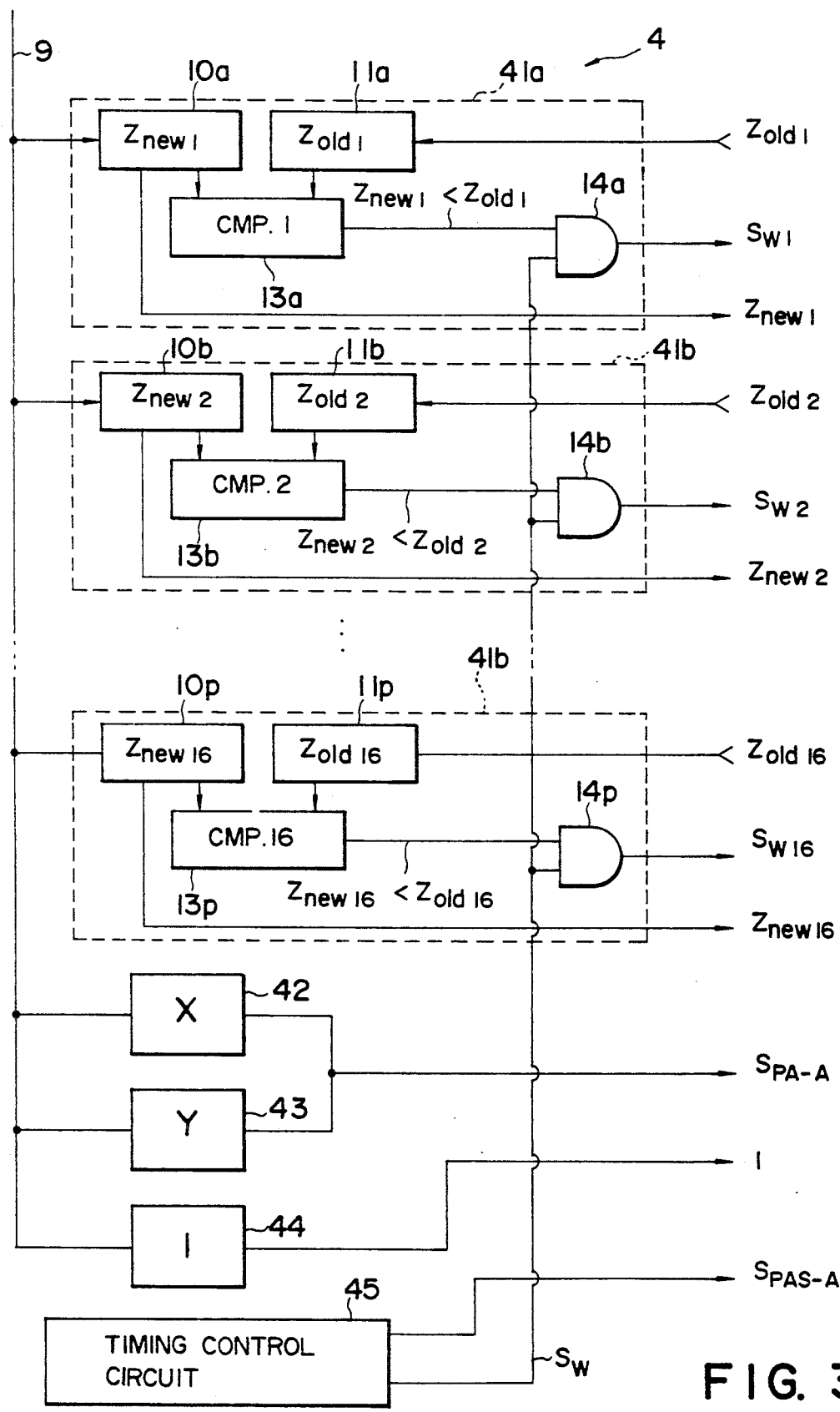
FIG. 3 is a block diagram showing an example of a main portion in a renewal circuit of a Z-comparison and Z-buffer/picture data buffer.

The killer circuit comprises, as shown in FIG. 2, a Z-comparison and renewal circuit 4 for comparing new data with old data and renewing a Z-buffer and picture data buffer, as shown in FIG. 3, a Z-buffer 5 for storing data in a depth direction, a picture data buffer 6 for storing picture data, an arithmetical mean circuit 7 for operating an arithmetical mean, a frame buffer 8 for storing data by a pixel unit, and an input data bus 9.

Furthermore, a concrete example of a main portion of the Z-comparison and renewal circuit 4 is shown in FIG. 3.

The jagged-edge killer circuit according to the present invention is characterized in that one pixel of the displayed picture is divided into sub-pixels in predetermined numbers such as sixteen of 4 by 4, both new and old distance data in the depth direction of each sub-pixel is compared each other, the picture data and the distance data in the depth direction of each sub-pixel are respectively rewritten corresponding to the comparison result, and an arithmetical mean value is derived from the rewritten picture data of the sub-pixels corresponding to one pixel and used as the picture data of one pixel. Accordingly, when data of X and Y addresses on the frame buffer of the pixel and the distance data $Z_{new1}$ to $Z_{new16}$ in the depth direction of the sub-pixels are supplied through the input bus 9 to the Z-comparison and renewal circuit 4 for the Z-buffer and picture data buffer, new picture data of the pixel unit is written in the picture data buffer 6. Namely, the new distance data $Z_{new1}$ to $Z_{new16}$ in the depth direction of the sub-pixels are compared with old distance data $Z_{old1}$ to $Z_{old16}$, sub-pixels having a shorter distance from the viewpoint within the subdivided sub-pixels are renewed with respect to their storage content in the buffer 6, and the storage content of the Z-buffer 5 is renewed by the distance data of sub-pixels corresponding to the new pixels.

In FIG. 3, when the picture data about the luminance and color is outputted to the picture data buffer 6, a latch circuit 42 latches data of X address on the frame buffer of the pixel, which are supplied through the input data bus 9 to the renewal circuit 4, and a latch circuit 43 latches data of Y address. The new distance data $Z_{new1}$ to $Z_{new16}$ in the depth direction of the sixteen sub-pixels corresponding to one pixel are respectively latched by the concerned circuit of latch circuits 10a to 10p of Z-comparison circuit 41a to 41p individually mounted to each sub-pixel.

A Z-comparison circuit 41a in the sixteen circuits 41a to 41p is provided for comparing distance data in the depth direction of the first sub-pixel, a circuit 41b handles the second sub-pixel, and a circuit 41p handles the sixteenth sub-pixel according to the same manner.

A pixel address signal $S_{PA-A}$ is calculated on the basis of both values of the X and Y addresses which are latched by the latch circuit 42 and 43, respectively, so as to output it to the Z-buffer 5 and picture data buffer 6. A timing control circuit 45 makes the signal $S_{PAS-A}$ active, and controls each timing of respective latch circuit. In this condition, a write enable signal $S_W$ for the Z-buffer and picture data, is turned to be inactive.

Figure 4:
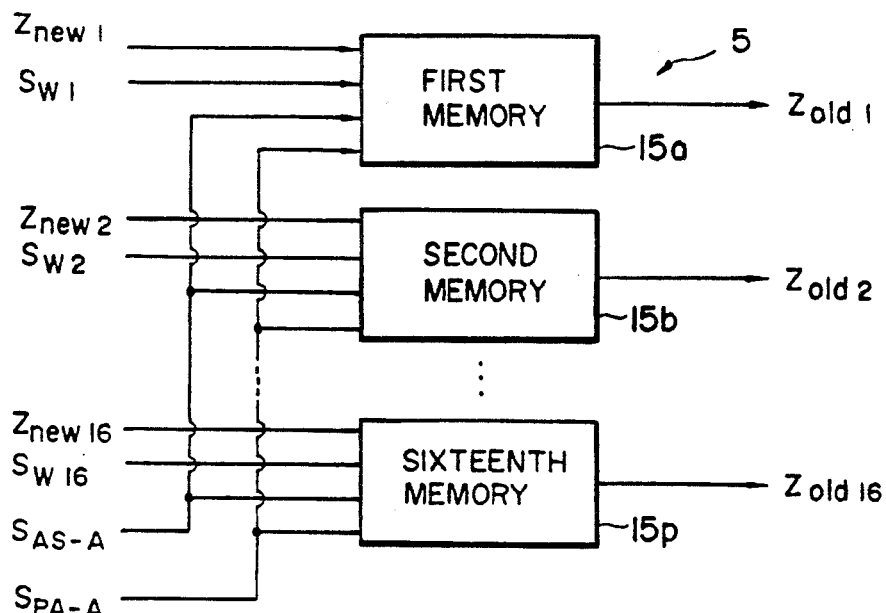
FIG. 4 is a block diagram showing an example of a main portion of the Z-buffer.

Referring FIGS. 2 to 4, when the signal $S_{PAS-A}$ becomes active, the Z-buffer 5 reads out the distance data $Z_{old1}$ to $Z_{old16}$ of the sub-pixel 1 to 16 in the depth direction which are stored in the memories 15a to 15p of the Z-buffer 5. These data $Z_{old1}$ to $Z_{old16}$ are latched by the latch circuit 11a to 11p provided in the Z-comparison circuits 41a to 41p.

The new distance data $Z_{new1}$ to $Z_{new16}$ latched by the latch circuit 10a to 10p, are respectively supplied to the corresponding memories 15a to 15p, at the same time, to the corresponding comparison circuits 13a to 13p. The circuits 13a to 13p are received the old data $Z_{old1}$ to $Z_{old16}$ from the latch circuits 11a to 11p.

The comparison circuits 13a to 13p each compare the new data $Z_{new1}$ to $Z_{new16}$ with the old data $Z_{old1}$ to $Z_{old16}$ in the manner that the corresponding pair is compared each other. In this comparison, when "$Z_{newi} < Z_{oldi}$" (where a character i is any of 1 to 16), the concerned circuits 13a to 13p output active signals to AND circuits 14a to 14p corresponding thereto.

If the circuits 13a to 13p ascertain the active signals, the timing control circuit 45 causes the write enable signal $S_W$ to be active.

Here, for example, when the AND circuit 14a receives an active signal from the comparison circuit 13a as the comparison result, the AND circuit 14a outputs a buffer write enable signal $S_{W1}$ for the Z-buffer and picture data buffer if the write enable signal $S_W$ is active, so that the distance data corresponding to the address signal $S_{PA-A}$ is renewed in the concerned memory 15a, as shown in FIG. 4, by the distance data $Z_{new1}$ of the sub-pixel 1 latched by the latch circuit 10a.

The picture data of the sub-pixel 1 corresponding to the signal $S_{PA-A}$, is also renewed by the picture data latched by latch circuit 44.

When the AND circuit 14b receives an active signal from the comparison circuit 13b as the comparison result, the AND circuit 14b outputs a buffer write enable signal $S_{W2}$ for the Z-buffer and picture data buffer if the write enable signal $S_W$ is active, so that the distance data corresponding to the address signal $S_{PAS-A}$ is renewed in the concerned memory 15b, as shown in FIG. 4, by the distance data $Z_{new2}$ of the sub-pixel 2 latched by the latch circuit 10b. The picture data of the sub-pixel 2 corresponding to the signal $S_{PA\text{-}A}$, is also renewed by the picture data latched by latch circuit 44.

Regarding the sub-pixels 3 to 16, the distance data $Z_{new3}$ to $Z_{new16}$ and picture data of sub-pixels 3 to 16 are renewed by the same manner as the sub-pixels 1 and 2.

When the Z-buffer 5 and picture data buffer 6 complete the renewal operation, the timing control circuit 45 causes both the signal $S_{PAS\text{-}A}$ and write enable signal $S_W$ to be non-active. Distance data of entire sub-pixels of the Z-buffer are initially set to the maximum value at starting the scene, namely, the most distant position value from the viewpoint.

Accordingly, both the picture data and the distance data of the sub-pixel i are renewed on the basis of a memory $15_i$ having the output $Z_{oldi}$ and input signals $Z_{newi}$, $S_{Wi}$, $S_{PA\text{-}A}$ and a pixel address strobe signal $S_{PAS\text{-}A}$. The renewal are performed when the pixel address strobe signal $S_{PAS\text{-}A}$ is active.

In FIG. 5 showing the main portion of the picture data buffer 6, the picture data buffer 6 comprises the first buffer memory 16 and the second buffer memory 17 each surrounded by a dotted line so as to construct a double buffer.

Memories 16a to 16p of the first buffer memory 16 and memories 17a to 17p of the second buffer memory 17 respectively correspond to the first to sixteenth sub-pixels 1 to 16 for storing picture data such as luminance data $I_1$ to $I_{16}$ thereof.

For example, while the renewal circuit 4 has an access to the first buffer memory 16, the arithmetical mean circuit 7 has an access to the second buffer memory 17. In contrast, while the circuit 4 has an access to the second buffer memory 17, the circuit 7 has an access to the first buffer memory 16.

Numerals 18a to 18p, 19a to 19p and 20 to 23 denotes selectors. The selectors 18a to 18p are used for selecting the buffer memory which supplies the picture data $I_1$ to $I_{16}$ such as the luminance (or color) data to the arithmetical mean circuit 7, and the selectors 19a to 19p are used for selecting the buffer memory which supplies to the arithmetical mean circuit 7 with flags $F_{W1}$ to $F_{W16}$ for representing that the picture data have been written.

The selector 20 is used for selecting an address strobe signal used by the first buffer 16 from the pixel address strobe signal $S_{PAS\text{-}A}$ of the renewal circuit 4 and the pixel address strobe signal $S_{PAS\text{-}B}$ of the arithmetical circuit 7.

The selector 21 is used for selecting an address strobe signal used by the second buffer memory 17 from the pixel address strobe signal $S_{PAS\text{-}A}$ of the renewal circuit 4 and the pixel address strobe signal $S_{PAS\text{-}B}$ of the arithmetical mean circuit 7.

The selector 22 is used for selecting an address used by the first buffer memory 16 form the pixel address signal $S_{PA\text{-}A}$ of the renewal circuit 4 and the pixel address signal $S_{PA\text{-}B}$ of the arithmetical mean circuit 7.

The selector 23 is used for selecting an address used by the second buffer memory 17 from the pixel address signal $S_{PA\text{-}A}$ of the renewal circuit 4 and the pixel address signal $S_{PA\text{-}B}$ of the arithmetical means circuit 7.

If both the pixel address strobe signal $S_{PAS\text{-}A}$ and the buffer write enable signal $S_{W1}$ becomes active when the renewal circuit 4 selects the first memory 16 of the buffer 6 and the arithmetical mean circuit 7 selects the second memory 17 of the buffer 6, the picture data I is stored in the memory 16a as the luminance or color signal of the sub-pixel 1 according to the pixel address signal $S_{PA\text{-}A}$ of the circuit 4. At this time, the flag for representing that the picture data of the sub-pixel 1 corresponding to the signal $S_{PA\text{-}A}$ have been written, becomes true so as to be stored in the memory 16a.

As is in the same manner, if both the pixel address strobe signal $S_{PAS\text{-}A}$ and the buffer write enable signal $S_{W2}$ (or any of $S_{W3}$ to $S_{W16}$) becomes active when the renewal circuit 4 selects the first memory 16 of the buffer 6 and the arithmetical mean circuit 7 selects the second memory 17 of the buffer 6, the picture data I is stored in the memory 16b (any of 16c to 16p) as the luminance or color signal of the sub-pixel 2 (or any of 3 to 16) according to the pixel address signal $S_{PAS\text{-}A}$ of the circuit 4. At this time, the flag for representing that the picture data of the sub-pixel 1 corresponding to the signal $S_{PA\text{-}A}$ have been written, becomes true so as to be stored in the memory 16b (or any of 16c to 16p).

When the renewal circuit 4 selects the first buffer memory 16, the second memory 17 is selected by the arithmetical mean circuit 7. In this condition, hen the signal $S_{PAS\text{-}B}$ is active, the picture data of the sub-pixel 1 (or any of 2 to 16) corresponding to the address signal $S_{PA\text{-}B}$, is read out of the second memory 17a (or any of 17b to 17p) to be supply to the arithmetical mean circuit 7, and the flag $F_{W1}$ (or any of $F_{W2}$ to $F_{W16}$) for representing that the picture data of subpixel 1 to 16 of the signal $S_{PA\text{-}B}$ is read out of the second memory 17a (or any of 17b to 17p) so as to supply it to the arithmetical mean circuit 7.

There is performed a changeover of the first and second memories 16 and 17 at the start of the scene. At changing over the first and second memories 16 and 17, any memory selected from the memories 16 and 17 by the renewal circuit 4, is set to zero of the picture data and to be false of the flag that the picture data have been written.

Figure 6:
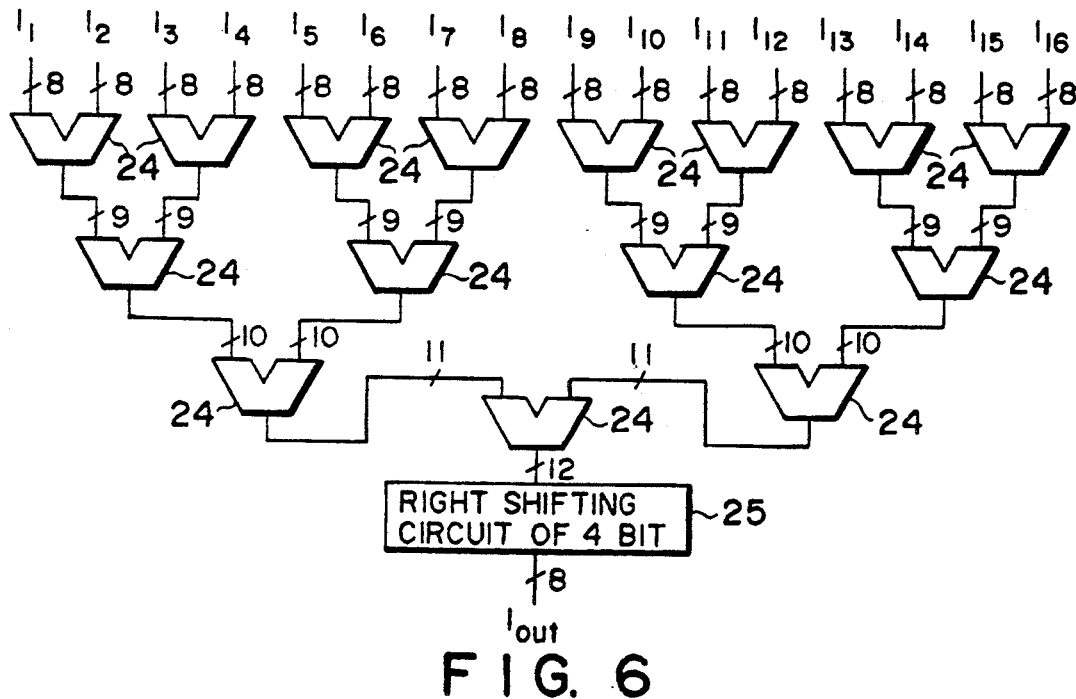
FIGS. 6 and 7 are block diagrams respectively showing several parts of an arithmetical mean circuit.
Figure 7:
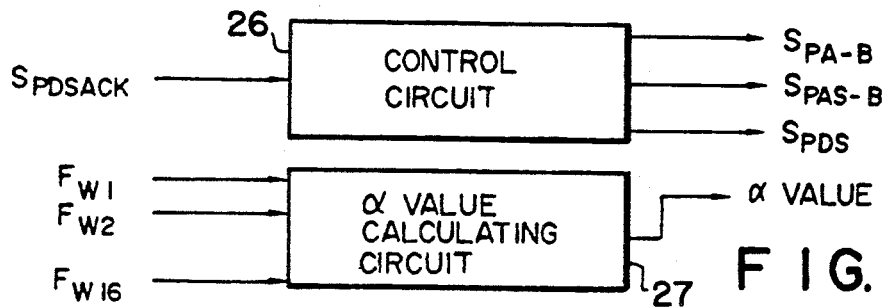

FIGS. 6 and 7 are block diagrams respectively showing one and another parts of the arithmetical mean circuit 7. In FIG. 6, a circuitry comprises a plurality of full-adders 24 for obtaining the arithmetical mean of the picture data $I_1$ (or any of $I_2$ to $I_{16}$) of the sub-pixel 1 (or any of 2 to 16), and right shifting circuit 25 having four bits. In FIG. 7, a circuitry comprises a control circuit 26 for generating a pixel address strobe signal $S_{PAS\text{-}B}$, a pixel address signal $S_{PA\text{-}B}$, a pixel data strobe signal $S_{PDS}$ and so on, and an $\alpha$ value calculating circuit 27.

Namely, the control circuit 26 sequentially generates the addresses of the entire pixels of one scene so as to output as the pixel address signal $S_{PA\text{-}B}$. If one pixel address is fixed, the control circuit 26 causes the pixel address strobe signal to be active.

When the signal $S_{PAS\text{-}B}$ becomes active, the picture data $I_1$ (or any of $I_2$ to $I_{16}$) of the pixel 1 (or any of 2 to 16) is read out of sixteen memories provided in any buffer memory which is selected from the first and second buffer memories 16 and 17 in the buffer 6 by the mean circuit 7 corresponding to the signal $S_{PA\text{-}B}$. Any one selected from the picture data $I_1$ to $I_{16}$ is supplied to the circuitry having the full-adders 24 and the four-bit right shifted circuit 25. In this circuitry, an arithmetical mean value $I_{out}$ of the picture data $I_1$ to $I_{16}$ is calculated to output it to the frame buffer 8.

any one of the flags $F_{W1}$ to $F_{W16}$ for representing that the picture data have been written, is read out of sixteen memories of the buffer memory which is selected by the mean circuit 7 from the first and second memories 16 and 17 of the buffer 6 corresponding to the signal $S_{PA\text{-}B}$, thereby outputting it to the $\alpha$ value calculating circuit 27 of the mean circuit 7.

The α value calculating circuit 27 counts a number flags which are true in the flag $F_{W1}$ to $F_{W16}$ for representing that the picture data have been written, thereby setting an α value. The α value is used when another two-dimensional pictures are matched behind the picture generated by the jagged-edge killer circuit. A luminance I of the picture after matching is obtained by the following equation.

$$I = I_{out} + \{(16-\alpha)/16\} \times I_{back}$$

where $I_{out}$ designates a pixel luminance of the picture generated by the jagged-edge killer circuit, and $I_{back}$ designates a pixel luminance of the two-dimensional picture matched behind the picture which is generated by the jagged-edge circuit.

When the mean value $I_{out}$ and the α value outputted from the circuit 7 become stable, the signal $S_{PDS}$ outputted from the control circuit 26 is caused to be active, thereby allowing the values $I_{out}$ and the α value to be supplied to an external circuit such as frame buffer 8.

When the frame buffer 8 receives both the values $I_{out}$ and α, the buffer 8 causes a pixel data strobe acknowledge signal $S_{PDSACK}$ to be active. If the signal $S_{PDSACK}$ is caused to be active, the control circuit 26 of the mean circuit 7 causes the signals $S_{PAS-B}$, $S_{PA-B}$, and $S_{PDS}$ to be inactive, thereby advancing an operation into the next process.

What is claimed is:

1. A jagged-edge killer circuit for a three-dimensional display, comprising:
    a frame buffer for storing data of each pixel on the display screen by a pixel unit;
    a Z-buffer for storing distance data in a depth direction of a picture by a sub-pixel unit into which said pixel as a storage unit of said frame buffer is subdivided in a predetermined number;
    a picture data buffer for storing picture data by said sub-pixel unit;
    means for comparing said data stored in said Z-buffer with new distance data in the depth direction with respect to each new sub-pixel into which a new pixel is subdivided in said predetermined number when picture data of said new pixel are written in said picture data buffer;
    first means for renewing storage contents of said picture data buffer with respect to only sub-pixel having nearer distances in the depth direction within said sub-pixels subdivided rom said new pixel into said predetermined number on the basis of a comparison result of said means for comparing;
    second means for renewing storage contents of said Z-buffer by said new distance data of said sub-pixels having said predetermined number corresponding to said new pixel; and
    generating means for generating picture data of said pixel unit in said frame buffer by performing an arithmetical mean of said picture data of said sub-pixel unit having said predetermined number in said picture data buffer;
    wherein said picture data buffer comprises a first buffer memory having a plurality of memories for storing picture data of each sub-pixel, a second buffer memory having a plurality of memories of each sub-pixel, first group selectors for selecting said memories outputting said picture data to said generating means, second group selectors for selecting said memories outputting flags for representing that said picture data have been written to said generating means, and third group selectors for selecting memories using several address signals.

2. A jagged-edge killer circuit of claim 1, wherein said first and second means comprises a Z-comparison and renewal circuit for said Z-buffer and picture data buffer which receives old distance data of said sub-pixel unit from said Z-buffer, outputs various pixel address signal, new distance data of said sub-pixel unit and a write signal to said Z-buffer and said picture data buffer, and outputs said picture data to said picture data buffer.

3. A jagged-edge killer circuit of claim 1, wherein said means for generating picture data comprises an arithmetical mean circuit which receives a plurality of write flags of individual sub-pixels subdivided from said pixel, and a plurality of picture data of said subdivided sub-pixels, and which supplies various address signals to said picture data buffer and frame buffer, and an α value to said frame buffer, said α value representing the number of said write flags which have a true value for representing that said picture data have written to said generating means.

4. A jagged-edge killer circuit of claim 2, wherein said renewal circuit comprises
    a timing control circuit for supplying said write signal and a first pixel address strobe signal;
    a plurality of Z-comparison circuits each corresponding to said sub-pixels, and each having a first latch circuit for latching new distance data of each sub-pixel, a second latch circuit for latching old distance data of each sub-pixel, a comparator which compares said new distance data with said old distance data of each sub-pixel, and an AND circuit for operating a logical product of a comparison result of said comparator and said write signal from said timing control circuit;
    a third latch circuit for latching an X axis value on the frame buffer of said pixel;
    a fourth latch circuit for latching a Y axis value on the frame buffer of said pixel; and
    a fifth latch circuit for latching luminance data of said pixels.

5. A jagged-edge killer circuit of claim 1, wherein said Z-buffer comprises a plurality of memories corresponding to said sub-pixels subdivided from said pixel into said predetermined number, each memory which outputs old data of the concerned sub-pixel, and receives new data, write signal, and various address signals of each sub-pixel.

6. A jagged-edge killer circuit of claim 2; wherein said arithmetical mean circuit comprises
    a plurality of full-adders which are constructed in a multi-stage, in which first stage adders receives any two data of said plurality of picture data corresponding to said sub-pixels, and succeeding stage adders receives any two outputs of said first stage adders or previous stage adders, and
    a shift circuit for shifting data to a right direction for 4 bits on the basis of an output of final stage adders.

7. A jagged-edge killer circuit of claim 2, wherein said arithmetical mean circuit comprises:
    a control circuit for outputting a pixel address signal, pixel address strobe signal and a pixel data strobe signal by sequentially generating entire pixel addresses of one scene of the picture data, thereby activating a pixel address strobe signal, and
    an α value calculating circuit for setting an value by counting the number of flags which have true value in a plurality of flags for representing that the picture data have been written, said α value representing said number of flags counted.

* * * * *